(12) United States Patent
Huang et al.

(10) Patent No.: US 10,759,238 B2
(45) Date of Patent: Sep. 1, 2020

(54) MANUAL INTERNAL SLIP VALVE PNEUMATIC TIRE SEATER

(71) Applicant: Gaither Tool Company, Inc., Jacksonville, IL (US)

(72) Inventors: Jime Huang, Taichung (TW); Richard W. Brahler, II, Jacksonville, IL (US)

(73) Assignee: Gaither Tool Company, Inc., Jacksonville, IL (US)

(*) Notice: Subject to any disclaimer, the term of this patent is extended or adjusted under 35 U.S.C. 154(b) by 189 days.

(21) Appl. No.: 15/730,909

(22) Filed: Oct. 12, 2017

(65) Prior Publication Data

US 2019/0111742 A1 Apr. 18, 2019

(51) Int. Cl.
*B60C 25/14* (2006.01)

(52) U.S. Cl.
CPC ................... *B60C 25/145* (2013.01)

(58) Field of Classification Search
CPC combination set(s) only.
See application file for complete search history.

(56) References Cited

U.S. PATENT DOCUMENTS

| | | |
|---|---|---|
| 2,441,186 A | 5/1948 | Cooper |
| 3,788,527 A | 1/1974 | Matson |
| 3,866,654 A | 2/1975 | Duquesne |
| 3,915,339 A | 10/1975 | Matson |
| 4,676,402 A | 6/1987 | Stetson |
| 4,767,024 A | 8/1988 | Rappen |
| 4,817,821 A | 4/1989 | Simoens |
| 5,042,547 A | 8/1991 | Van De Sype |
| 5,072,764 A | 12/1991 | Ochoa |
| 5,143,256 A | 9/1992 | Wadensten |
| 5,168,911 A | 12/1992 | Gottschalk |
| 5,456,302 A | 10/1995 | Demers |
| 5,853,160 A | 12/1998 | Hurdis |
| 6,179,033 B1 | 1/2001 | Demers |
| 6,726,059 B2 | 4/2004 | Treat |
| 6,925,997 B2 | 8/2005 | Sheng |
| 7,866,308 B2 | 1/2011 | Jones et al. |
| 8,261,728 B1 | 9/2012 | Tseng |
| 8,752,604 B2 * | 6/2014 | Kunau ................. B60C 25/145 157/1 |
| 2002/0134365 A1 | 9/2002 | Gray |
| 2003/0005918 A1 | 1/2003 | Jones |
| 2003/0178151 A1 | 9/2003 | Ritchie et al. |
| 2005/0188977 A1 | 9/2005 | Wygant |
| 2006/0169265 A1 | 8/2006 | Lai |
| 2007/0028909 A1 | 2/2007 | Wood |
| 2009/0178660 A1 | 7/2009 | Huang |

(Continued)

*Primary Examiner* — Jessica Cahill
*Assistant Examiner* — Christopher M Afful
(74) *Attorney, Agent, or Firm* — .Qpatents

(57) ABSTRACT

A pneumatic tire seater configured to seat a tubeless tire on a rim has a manual internal slip (MIS) valve mounted on the end of a tank. A nozzle is mounted on one end of the MIS valve, and the other end extends partially into the air tank. The MIS valve has a slotted chamber with slotted chamber holes, and a slip cylinder that fits within the slotted chamber and has slip cylinder holes. A compression spring in the MIS valve exerts force on the slotted cylinder, pushing it forward to line up the cylinder holes with the slotted chamber holes and release the high pressure air from within the tank which goes through the MIS valve and out the nozzle.

19 Claims, 11 Drawing Sheets

(56) References Cited

U.S. PATENT DOCUMENTS

| | | |
|---|---|---|
| 2010/0199961 A1 | 8/2010 | Liao |
| 2011/0120437 A1 | 5/2011 | Tippmann, Jr. et al. |
| 2011/0253318 A1* | 10/2011 | Kunau .................. B60C 25/145 |
| | | 157/1.17 |
| 2012/0192707 A1 | 8/2012 | Rogers et al. |
| 2012/0192847 A1 | 8/2012 | Hague et al. |
| 2012/0318251 A1 | 12/2012 | Tseng |
| 2013/0104868 A1 | 5/2013 | Sikes |
| 2013/0239937 A1 | 9/2013 | Macri et al. |
| 2016/0097188 A1* | 4/2016 | Eckberg .................. E03B 7/075 |
| | | 137/357 |
| 2016/0101659 A1* | 4/2016 | Kunau .................. B60C 25/145 |
| | | 157/1.1 |

* cited by examiner

MANUAL INTERNAL SLIP VALVE PNEUMATIC TIRE SEATER

BACKGROUND

Technical Field

Various embodiments of the present invention relate to tools, and more specifically, to tools for seating tubeless vehicle tires on wheel rims.

Description of Related Art

Tires for automobiles, trucks and other vehicles are designed to be mounted on wheels or rims. In the past, an inner tube was inflated between the tire and the rim. It was fairly easy to mount a tire on a rim by simply inflating the inner tube until the tire's bead was seated on the rim. Today, however, tubeless tires—that is, tires without inner tubes—have almost entirely supplanted the older technology that relied on inner tubes. Today's tubeless tires last longer, are less prone to going flat, and provide better performance than the older tires utilizing inner tubes. However, tubeless tires tend to be much more difficult to mount on a wheel than the older tires with inner tubes.

To mount a tubeless tire, each of the beads (edges) of the tire must be held airtight all the way around the two edges of the rim on which they mount to form an airtight chamber within the tire and wheel. When a tire is first placed on a rim prior to being inflated, there is generally a gap between the bead of the tire and the wheel's rim that prevents inflation with an air compressor. Seating the tire on the rim allows the tire to be pressurized. In some cases, smaller tires may be seated by injecting air through the valve stem while pressing the tire's bead against the rim to create a seal (e.g., bicycle or motorcycle tires). But this is extremely difficult to do with larger tires such as truck tires.

It is known in the art that a high volume of air blown rapidly between the rim and the bead of the tire can seat the tire on the rim. To accomplish this conventional pneumatic tire seaters generally include a large, yet portable, pressurized air tank with a valve leading to a discharge barrel. The tank and discharge barrel may be positioned to blow a high volume of air from the pressurized air tank into the tire. The air tank of conventional devices must be of sufficient volume—e.g., at least 15 liters or more—to hold enough air at a high pressure to expand the tire against the rim, completely filling the volume of the tire to a pressure greater than the atmospheric pressure in order to seat the tire against the rim. The large 15+ liter air tanks of conventional tire seating devices are quite unwieldy and take longer to fill with pressurized air.

SUMMARY

The present inventors recognized a need for a pneumatic tire seater with a smaller air tank that is more convenient to store, lift and carry. The various embodiments disclosed herein realize these and other benefits. The various embodiments disclose a pneumatic tire seater—sometimes called a bead seater—that includes an air tank, a manual internal slip (MIS) gas valve configured to extend partially into the air tank, a front handle connected to the MIS gas valve, and a nozzle connected to the MIS gas valve. The MIS gas valve has a slotted chamber with a number of slotted chamber holes. The MIS gas valve also has a slip cylinder with slip cylinder holes that correspond to the slotted chamber holes. The slip cylinder outside diameter is slightly less than the slotted chamber inside diameter. The slip cylinder holes line up with the slotted chamber holes in response to the handle being pushed forward, thus opening the MIS valve and releasing the pressurized air from the air tank. A user can direct the nozzle into the gap between an uninflated tire on a rim to blow the pressurized air into the tire and seat the tire's bead on the rim.

DESCRIPTION OF THE DRAWINGS

FIGS. 3A-B depict an exploded view of the manual internal slip valve showing the component parts according to various embodiments disclosed herein.

DETAILED DISCLOSURE

Figure 1A:
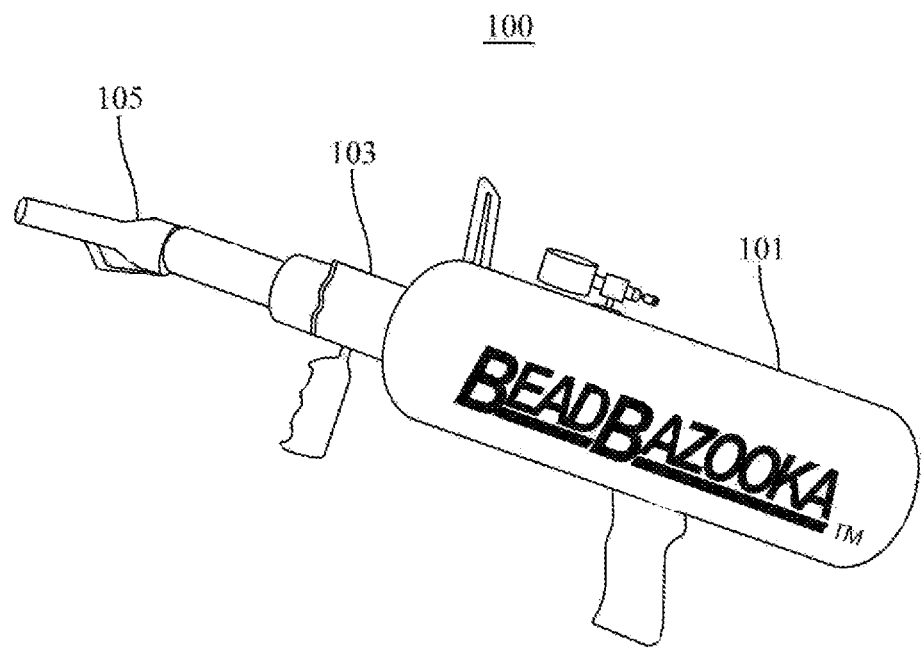
FIGS. 1A-C depict three views of an embodiment of an manual internal slip (MIS) pneumatic tire seater according to various embodiments disclosed herein.
Figure 1B:
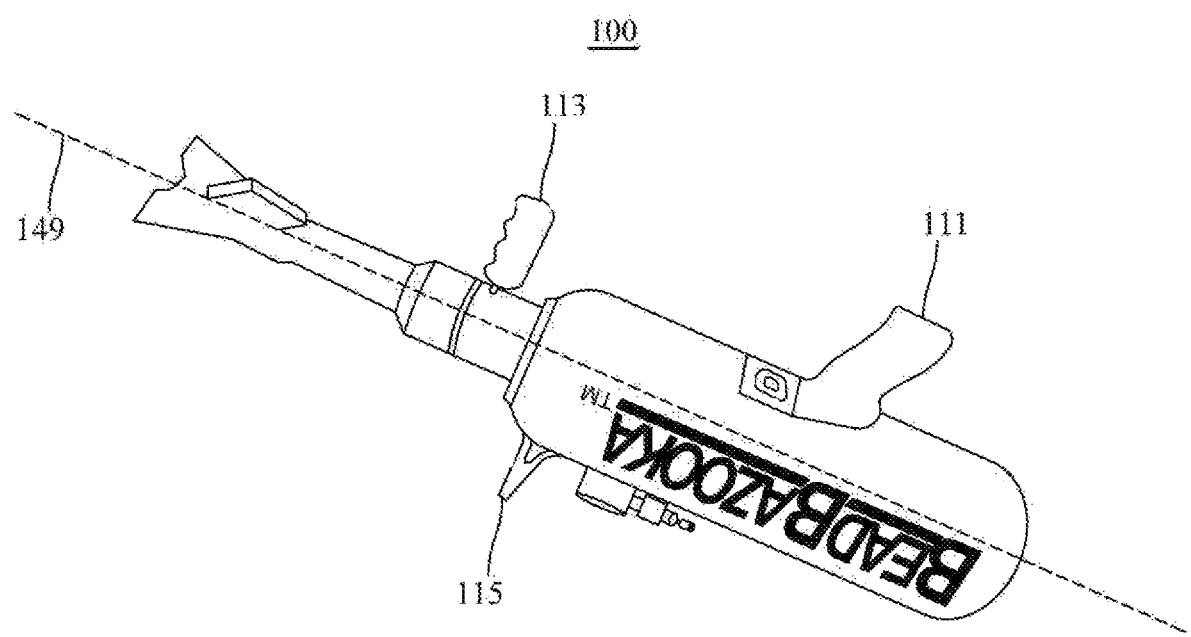
Figure 1C:
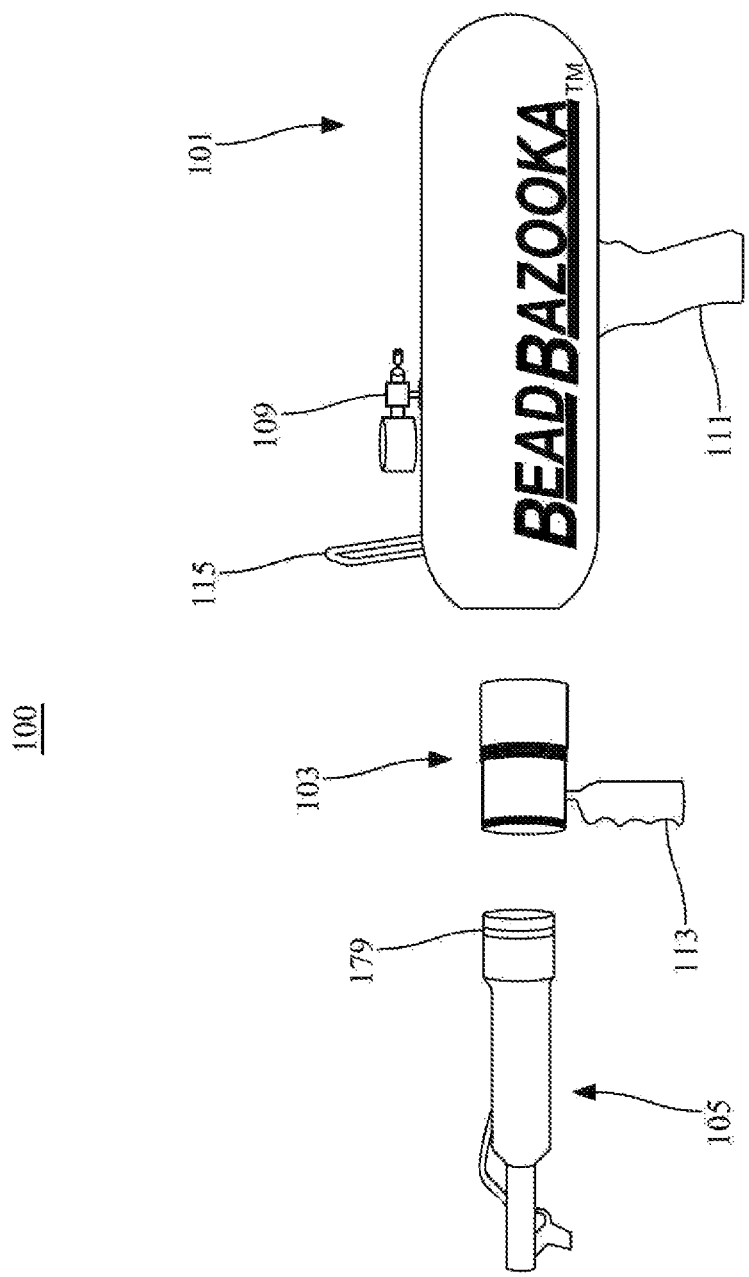

FIGS. 1A-B depict an embodiment of a manual internal slip (MIS) valve pneumatic tire seater 100 according to various embodiments disclosed herein. FIG. 1C shows a disassembled MIS valve pneumatic tire seater 100. Disclosed herein are various embodiments of high speed MIS valves for air or other gases, and methods of making and using the same. For the sake of simplicity the MIS valves are described herein in terms of releasing pressurized air held in the air tank 101. However, in actual practice, the various embodiments of the air tank and the high speed MIS valves may be used to hold and release any type of gas—that is, any type of substance in the gaseous state such as air, oxygen, carbon dioxide, nitrogen, or the like. The term "gas" as used herein is intended to mean a substance in the gaseous state.

The MIS valve pneumatic tire seater 100 depicted in FIG. 1C is disassembled into three parts: the air tank 101, the MIS valve 103 and the nozzle assembly 105. This particular embodiment has an air tank 101 with a cylindrical body and rounded ends that contains 6 liters of space for air. (The air volume in air tank 101 may be slightly less than 6 liters since the MIS valve 103 takes of some space inside the tank.) The air tank 101 depicted in FIGS. 1A-C has an outside diameter of 5.0 inches and a cylindrical body length (between the welds at the rounded ends) of 13.5 inches. Various embodiments are implemented with different sized cylindrical air tanks, including for example tanks with outside diameters, or ranges of outside diameters, including: 4.0 inches, 5.0 inches, 6.0 inches, greater than 3.75 inches, greater than 4.75 inches, greater than 5.75 inches, between 3.75 and 6.5 inches; and/or between 3.75 and 10.5 inches in diameter.

Figure 7A:
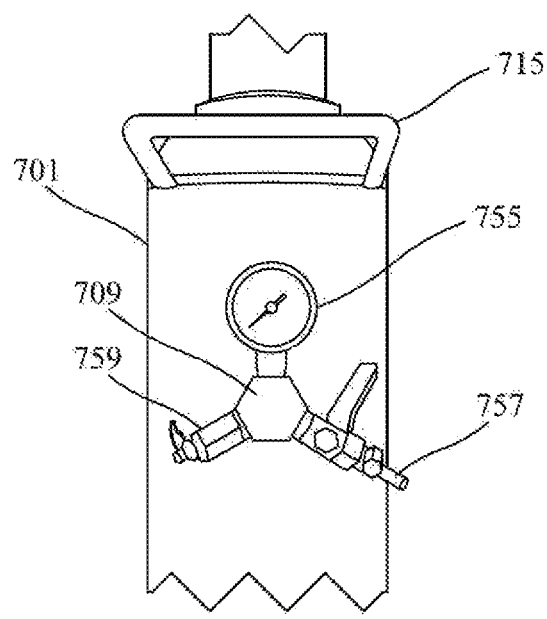
FIGS. 7A-B respectively depict a top view and a side view of the control cluster, according to various embodiments disclosed herein.
Figure 7B:
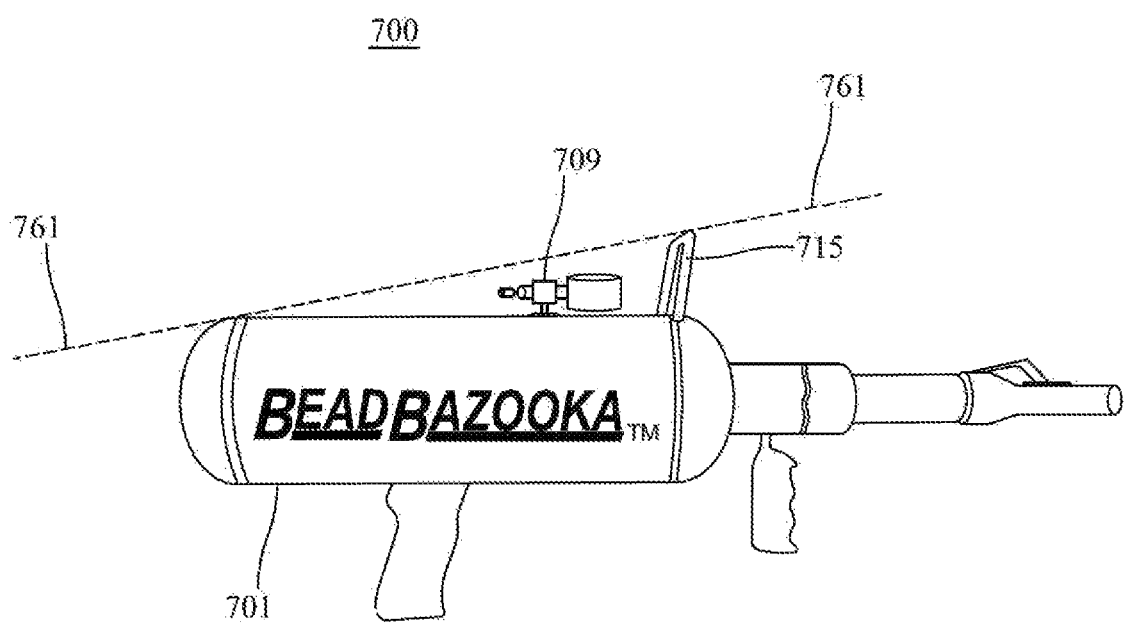

In various embodiments the tank 101 has a control cluster 109 mounted on it. Details of control cluster are shown in FIGS. 7A-B. In various embodiments the control cluster 109 is mounted on the top of tank 101, near a carry handle 115, and a rear handle 111 is mounted on the bottom of tank 101. A front handle 113 is attached to MIS valve 103. In the embodiment depicted in FIG. 1B the air tank 101, the MIS valve 103 and the nozzle assembly 105 are aligned along a central axis 149. In other embodiments the air tank 101, the MIS valve 103 and/or the nozzle assembly 105 may not all be aligned along the same central axis. For example, the MIS valve 103 and the nozzle assembly 105 may be mounted off-center with respect to central axis 149 of the air tank 101. In such off-center embodiments the MIS valve 103 has a different central axis than the central axis 149 of the air tank.

The carry handle 115 is fastened on tank 101 in a position making it easy to lift and carry the MIS valve pneumatic tire seater 100. Various embodiments of the carry handle 115 may have a handhold bar that is orthogonal to the central axis 149 of cylindrical tank 101. When a user holds the MIS valve pneumatic tire seater 100 by carry handle 115, the tank 101 tilts downward and nozzle assembly 105 tilts upward (at approximately a 60 degree angle). In this way, the MIS valve pneumatic tire seater 100 can conveniently be hung on a hook or specially designed bracket with the nozzle assembly 105 pointing upward and the tank hanging down. A user can lay the MIS valve pneumatic tire seater 100 on its side and the carry handle 115 will prevent the device from being inadvertently rolled over, damaging the control cluster 109. A user can also sit the MIS valve pneumatic tire seater 100 upside down, balanced on the handhold bar of carry handle 115 with rear handle 111 and front handle 113 pointing upwards. The carry handle 115 provides sufficient clearance to avoid damaging the control cluster 109.

In other embodiments the rear handle 111 and control cluster 109 may be mounted in different positions on the MIS valve pneumatic tire seater. For example, in another embodiment the rear handle 111 may be mounted on the right side of tank 101 (e.g., to be held in the right hand of a right handed person), or the rear handle 111 may be mounted on the left side (e.g., to be held in the left hand of a left handed person). Similarly, in other embodiments the front handle 113 may be mounted on the right side of tank 101 or on the left side of the tank 101. In other embodiments the control cluster 109 may be mounted on the bottom, or the front, or the rear. In the embodiment depicted in FIG. 1B the front handle 113 and rear handle 111 both extend along lines from a central axis 149 of tank 101. In other embodiments the front handle 113 and/or rear handle 111 may extend from the MIS pneumatic tire seater 100 in an orientation not along lines from central axis 149. Typically, the orientation of the front handle 113 and rear handle 111 can be adjusted by loosening the nut 179 on nozzle assembly 105, positioning nozzle assembly 105 in the desired orientation, and then tightening the nut 179 down against the distal end 335 of slotted chamber 321.

The embodiment depicted in FIGS. 1A-C with front handle 113 and rear handle 111 enables a user to easily hold and manipulate the MIS pneumatic tire seater 100 while mounting a tire. Grasping the rear handle 111 with one hand allows the user to rest the bottom side of tank 101 along their forearm, thus making it easy to move the MIS pneumatic tire seater 100 into position to seat a tire. The user's other hand can grasp front handle 113 which serves as a valve switch component in addition to being a handle to aid in holding the device. Various other embodiments have different types of valve switch components, including for example, a lever, a button, a toggle, a switch, a rotating collar, a bar, a trigger mechanism, and other such valve switch components as are known by those of ordinary skill in the art.

Figure 2A:
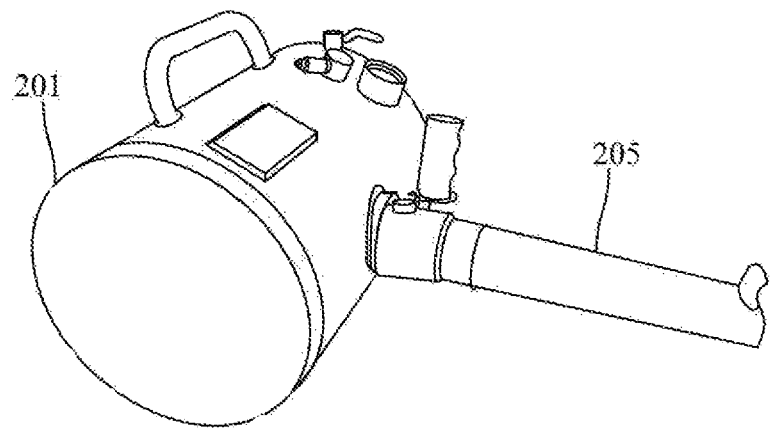
FIGS. 2A-B depict oblique views of a manual internal slip valve transverse tank pneumatic tire seater embodiment 200.
Figure 2B:
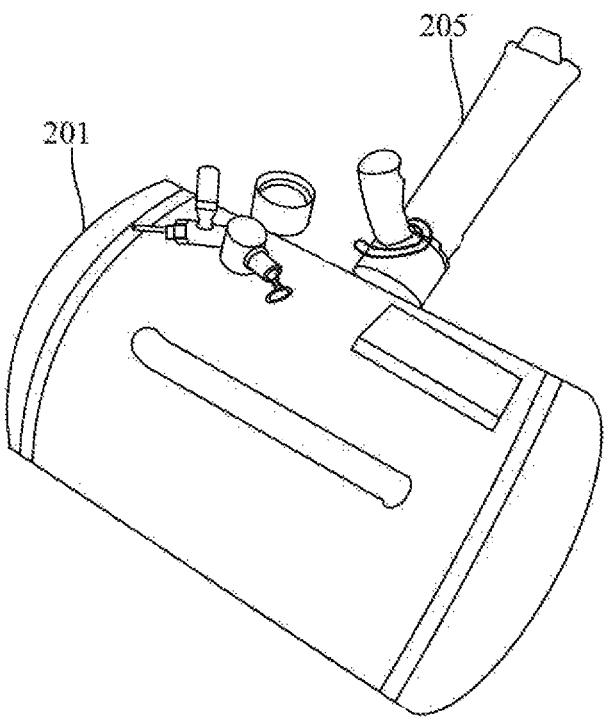

FIGS. 2A-B depict oblique views of a manual internal slip (MIS) valve transverse tank pneumatic tire seater embodiment 200. The nozzle 205 is mounted transverse to the tank 201—that is, perpendicular to the central axis of cylindrical tank 201. Various embodiments of pneumatic tire seaters have an assortment of air tank sizes. The MIS transverse tank pneumatic tire seater 200 depicted in FIGS. 2A-B has a 20 liter tank. The MIS pneumatic tire seater 100 shown in FIGS. 1A-C has a 6 liter tank. Other Embodiments have various sized air tanks, for example, a 12 liter tank, a 15 liter tank, a 9 liter tank, a 4 liter tank, and a 3 liter tank and a 38 liter tank. The MIS pneumatic tire seater 100 depicted in FIGS. 1A-C blows a stream of air that can easily seat a typical pickup truck tire, e.g., P235/75R15 sized tire. The MIS pneumatic tire seater 100 can also easily seat the larger 18 wheeler truck tires, e.g., 11R22.5G sized tires.

The tank size can be altered in various implementations to be as large or small as needed for a particular application. For example, a tank may be as large as 100 liters to as little as 0.5 liter, in 0.5 liter increments—e.g., 0.5 liter, 1.0 liter, 1.5 liter, 2.0 liter and so on up to 99.5 liter and 100.0 liter An upper tank size of 100 liters is an arbitrary limit based on weight. Tanks larger than 100 liters could be used with the various embodiments, but they would be difficult to lift and carry. Tanks larger than 100 liters may be used if either the tank is stationary or mounted on wheels (e.g., an air compressor tank). For example, in a factory or shop setting some embodiments have no need for a portable tank such as tank 101 depicted in FIGS. 1A-C. Instead the MIS valve 103 and nozzle assembly 105 are pneumatically connected directly to a source of compressed air via an air hose. For example, the MIS valve 103 and nozzle assembly 105 may be attached to an air compressor having a tank size of much greater than 100 liters, e.g., tanks of 100 gallons or more.

Figure 3A:
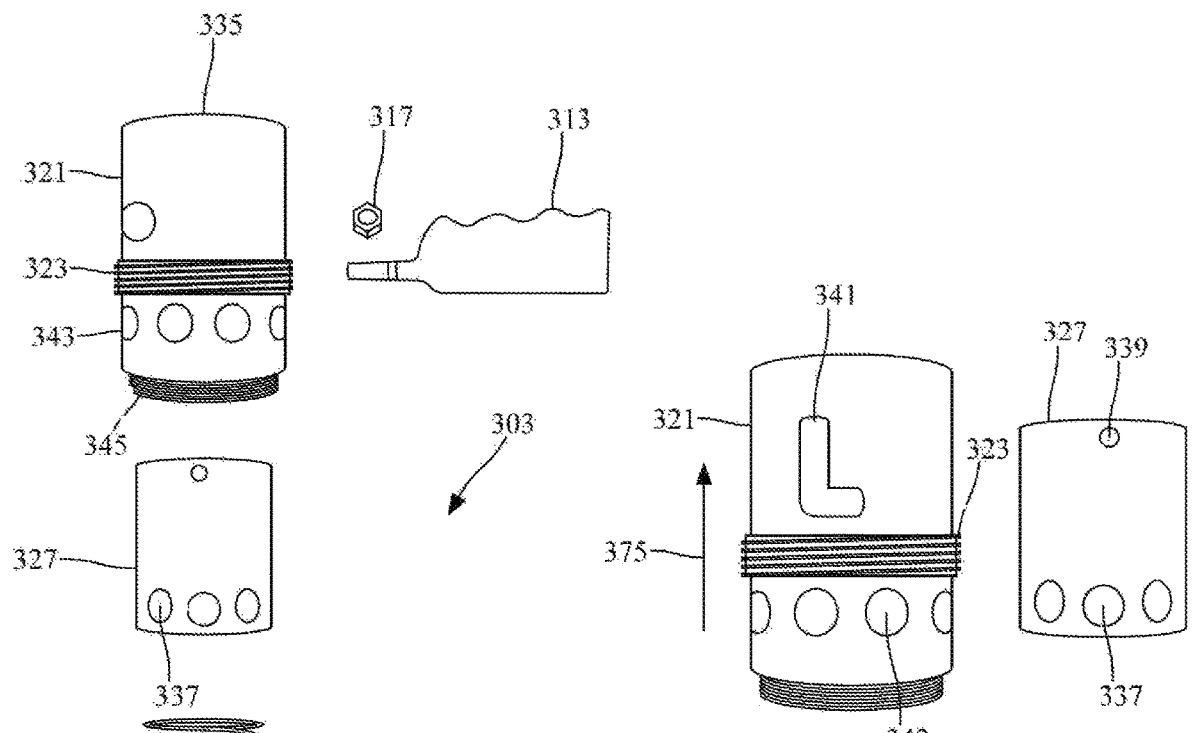
Figure 3A:
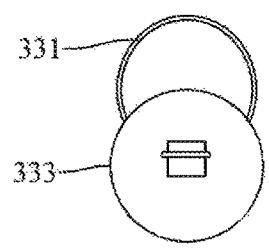
Figure 7C:
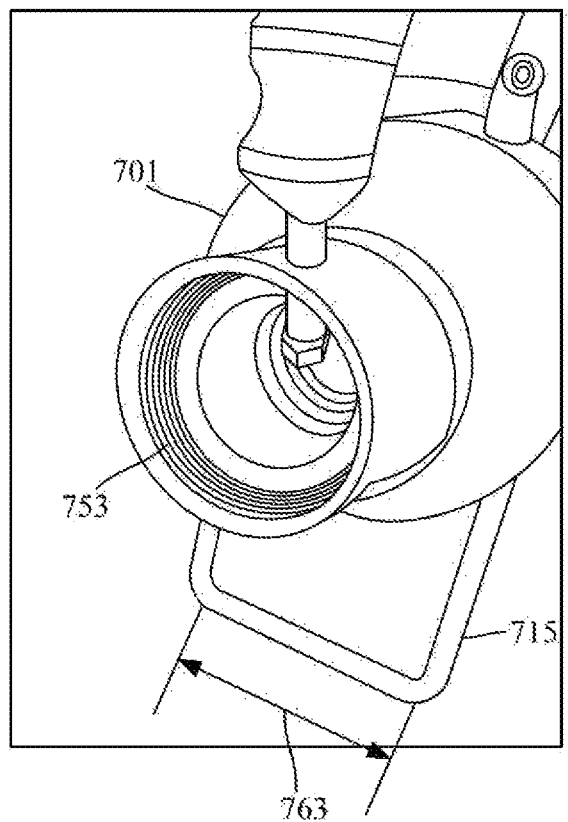
FIG. 7C is an oblique view depicting the distal end of the air tank according to various embodiments disclosed herein.

FIGS. 3A-B depict an exploded view of MIS valve 303 illustrating the component parts that are configured as part of the MIS valve 303, according to various embodiments disclosed herein. FIG. 3A is an exploded view of MIS valve 103 of FIG. 1A. The figure depicts a slotted chamber 321, a front handle 313, a slip cylinder 327, a compression spring 329, an O-ring 331 and an end cap 333. Typically, the slotted chamber 321 is fitted within a threaded hole in the air tank 101 (e.g., a threaded hole 753 as shown in FIG. 7C) or other a vessel suitable for storing pressurized gas. The female threaded hole at the distal end of air tank 101 can be seen in FIG. 7C.

A portion of the slotted chamber 321 extends into air tank 101—e.g., a portion to the left of the threads 323 shown in FIGS. 3A-B. Turning to FIG. 3B, the slotted chamber 321 also has female threads inside the opening at its distal end 335 that receive the male threaded portion of nozzle assembly 105 shown in FIG. 1C. In this way the nozzle assembly 105 can be securely fastened to the MIS pneumatic tire seater 100 by screwing the nozzle assembly 105 into the female threads inside the distal end of slotted chamber 321.

The nozzle assembly 105 has a nut 179 on it suitable for tightening down against the distal end 335 of slotted chamber 321. This makes it easier to align the nozzle assembly 105 to the MIS valve 103 and air tank 101. In some embodiments the slotted chamber 321 has male threads and the nozzle assembly 105 has female threads. One or more O-rings 331 fit into the assembly to prevent leakage of pressurized air from air tank 101.

The front handle 313 has a male threaded end that passes through an "L" shaped (or "T" shaped) slotted triggering hole 341 in the slotted chamber 321. A "T" shaped slotted triggering hole may, in some instances, allow the lever to be more easily manipulated by a left handed person. In various embodiments the shaped slotted triggering hole may be other shapes aside from an "L" shape or a "T" shape. For example, the shaped slotted triggering hole may be shaped roughly like a "J" (or double "J") so the user has to pull control lever 109 back slightly towards himself before moving it over and forward. This aids in preventing the MIS valve from being accidentally opened while the device is being picked up or handled. The slotted triggering hole 341, shown in FIG. 3B, acts as a guide for manipulating the front handle 313 to the open and closed positions of MIS valve 303. The front handle 313 screws into a female threaded hole 339 in the slip cylinder 327 so that the slip cylinder 327 moves in unison with the front handle 313. The female threaded hole 339 goes all the way through the slip cylinder 327. For added strength a nut 317 and lock washer are tightened down on the portion of the male threaded end of front handle 313 that extends through the female threaded hole 339 in the slip cylinder 327.

Upon assembly, the portion of the slotted chamber with holes 343 is positioned within the pressurized air tank 101, while the other portion of the slotted chamber 321 (on the distal side of threads 323) extends out of the tank to the atmosphere where the pressurized gas is to be released. The slip cylinder 327 fits into the proximal end 345 of the slotted chamber 321.

In various embodiments the slip cylinder 327 and the slotted chamber 321 each have one or more holes. When the holes of each component line up the MIS valve 100 is in an open state. Typically, the slip cylinder 327 and the slotted chamber 321 each have two or more holes, although in some embodiments they may each have only one hole—e.g., an elongated oval hole. In various embodiments the outer edges of holes 337 through slip cylinder 327 are rounded and polished, rather than being sharp edges. In other words, the edges where the holes 337 meet the outer surface of slip cylinder 327 are rounded, and sometimes polished so as not of have sharp edges. This may be done by machining the edges of the holes, or chamfering them with multiple adjacent micro-edges of varying slope, or other methods of providing rounded or curved edges as known by those of ordinary skill in the art. Further, the edges of the holes may be sanded or polished to promote smoothness. In this way the holes 337 of slip cylinder 327 with rounded edges can pass across the O-rings on the inside of slotted chamber 321 without wearing out the O-rings.

The slip cylinder 327 and spring 329 fit into the proximal end 345 of slotted chamber 321. In various embodiments the slip cylinder 327 is inserted into proximal end 345 because it won't fit into distal end 335. With the valve components in place the end cap 333 is screwed onto proximal end 345. In some embodiments the end cap 333 may be permanently affixed to slotted chamber 321 by welding, gluing, machine screws, bolting, or another like type of permanently affixing two materials.

FIG. 3B depicts O-ring 331. In practice the various embodiments have at least one O-ring, and may have three or more O-rings. An O-ring 331 may be provided within end cap 333, at the bottom of the end cap 333 past or towards the bottom of its female threads. The end-cap O-ring 331 may be positioned at the point where the bottom of end cap 333 comes in contact with the proximal end 345 of slotted chamber 321.

Figure 3C:
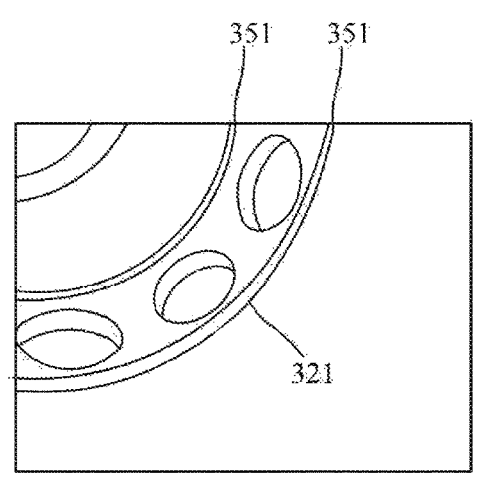
FIG. 3C depicts O-rings within a slip cylinder according to various embodiments disclosed herein.

Two or more other O-rings 331 may be provided in grooves 351 around the inner surface of slotted chamber 321. The O-rings in grooves 351 may be constructed from different materials, and be of different dimensions, than the O-ring in or near the end cap 333. One of the two grooves 351 for receiving an O-ring 331 may be located ahead of holes 343 in the distal direction 375, between slotted chamber holes 343 and slotted triggering hole 341. The other groove 351 may be located between the slotted chamber holes 343 and the proximal end of slotted chamber 321. FIG. 3C depicts two grooves 351. Other embodiments may have multiple grooves 351 on one or the other side of slotted chamber holes 343 (or both sides), or may have groove(s) 351 on only one side of slotted chamber holes 343. In other embodiments the groove(s) 351 for receiving O-rings 331 are implemented on the slip cylinder 327 relative to holes 337, rather than being on the slip cylinder 327. Typically the O-rings 331 are made from a flexible material such as rubber or a flexible synthetic material. However, some embodiments use other types of O-rings may be used such as the metal rings found in combustion engines, the leather rings found in air pumps, or other types of sealing rings as are known to those of ordinary skill in the art.

The female threads inside the opening at its distal end 335 have a smaller minor diameter (from crest to crest) than the cylindrical inner chamber of slotted chamber 321 that the slip cylinder 327 slides into. That is, the female threads are raised up (towards central axis 149) as compared to the inner surface of the rest of the cylindrical inner chamber. The slip cylinder 327 slides snugly into the cylindrical inner chamber of slotted chamber 321 from proximal end 345, but is too large to slide past the female threads just inside the distal end 335.

In some embodiments the spring 329 presses on the proximal end of slip cylinder 327, forcing it away from end cap 333 and towards the female threads near distal end 335 of the slotted chamber 321. In the embodiment depicted in FIG. 3A, however, the spring 329 fits into the slip cylinder 327, past slip cylinder holes 337, to a ledge on the inner surface of slip cylinder 327. The "ledge" is a portion of the hole that passes through the slip cylinder 327 machined to have a smaller inner diameter. The ledge prevents the spring 329 from passing all the way through the slip cylinder 327. Instead, the spring 329 pushes against the ledge inside slip cylinder 327, forcing slip cylinder 327 away from end cap 333 and towards the female threads near distal end 335 of the slotted chamber 321.

Figure 4A:
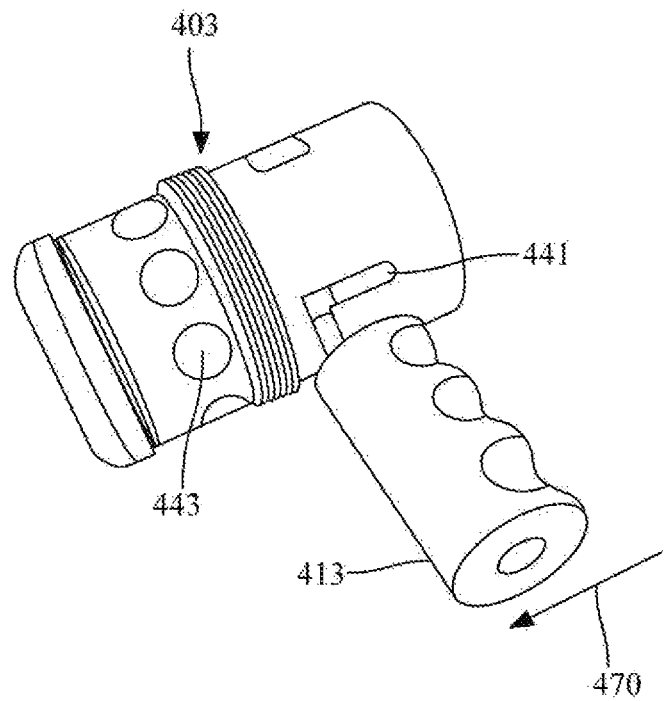
FIGS. 4A-B depict the manual internal slip valve in a closed position and in an open position, respectively, according to various embodiments disclosed herein.
Figure 4B:
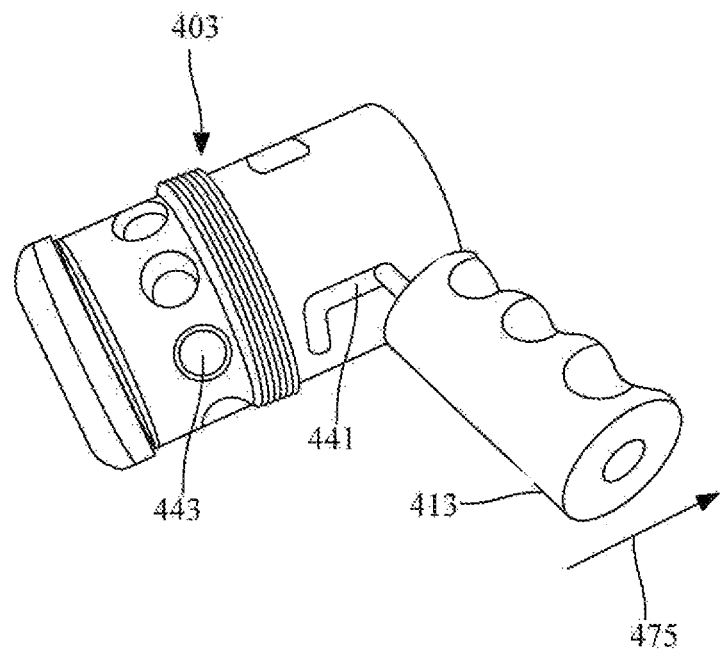

FIG. 4A depicts the MIS valve 403 in a closed position. FIG. 4B depicts the MIS valve 403 in an open position. In FIG. 4A the handle front 413 has been pulled back in the proximal direction 470 (toward the user), guided by the slotted triggering hole 441, to the closed position. To latch the handle in the closed position the user pulls front handle 413 in the proximal direction 470 all the way to end of the slotted triggering hole 441, then laterally twists the front handle 413 clockwise to the right (looking from the user's perspective) as shown in FIG. 4A. The front handle 413 twists about the central axis of the MIS valve 403. In the latched closed position the user can release the front handle 413 and the MIS valve 403 will remain closed (off). Some embodiments are configured so the user laterally twists the front handle 413 to the left rather than the right. Upon placing the MIS valve 403 in the closed position the tank 101 can be filled with pressurized air.

Once the tank 101 has been filled to a predefined air pressure, the MIS pneumatic tire seater 100 is ready to seat a tire's bead on the rim in order to mount the tire. From the closed position the user twists front handle 413 counter clockwise to the left, and pushes the handle forward in the distal direction 475. Direction 475 is called the distal direction because, upon opening the MIS valve 403, the pressurized air blows outward away from the user in the distal direction 475. In practice, it takes little or no force from the user to push front handle 413 forward. Depending upon the configuration, the MIS valve 403 opens so rapidly it would be difficult for the user to apply much if any force to push the front handle 413 forward in the distal direction 475. Instead, the force of spring 329 (FIG. 3A) aids in pushing the front handle 413 forward. As soon as the MIS valve 403 begins to open the air rushing through it may also aid in pushing the front handle 413 forward. The speed at which MIS valve 403 opens is dependent upon the force exerted by spring 329, as discussed below in conjunction with FIG. 5. As the front handle 413 moves forward, the slip cylinder holes 337 begins to line up with the slotted chamber holes 343 (443) as the MIS valve 403 moves toward the open position. The MIS valve 403 begins to open, releasing air from the tank, as soon as the slip cylinder holes 337 begin to line up with the slotted chamber holes 343. Pressurized air rushing through the partially overlapping sets of holes may aid in opening the valve to some extent.

In various embodiments the MIS valve is considered fully open once the holes are at least partially overlapped and the front handle 413 has moved 90% of the way it is capable of moving forward—that is, the holes of the slip cylinder and the holes of the slotted chamber. The MIS valve begins to open at the time the holes first begin to overlap. The opening time of the MIS valve is defined as the amount of time between when the MIS valve begins to open and when the MIS valve is fully open. The valve opening time at which the MIS valve opens is dependent upon a number of factors, including for example, the tightness of the slip cylinder in the slotted chamber, the size of the holes, the air pressure in the tank, and the spring rate. Various embodiments are characterized by different opening times, including the not limited to, opening times having ranges of: no greater than 10 ms (milliseconds), no greater than 20 ms, no greater than 30 ms, no greater than 40 ms, no greater than 50 ms, no greater than 60 ms, no greater than 70 ms, no greater than 80 ms, no greater than 85 ms, no greater than 90 ms, no greater than 100 ms, no greater than 120 ms, no greater than 140 ms, no greater than 150 ms, no greater than 160 ms, no greater than 180 ms, no greater than 200 ms, no greater than 225 ms, or no greater than 250 ms.

Typically, in the open position the holes of the slip cylinder 103 line up with holes of the slotted chamber 101. However, in some embodiments the holes are only partially lined up—that is, the holes overlap some. In such instances the MIS valve is considered open if the holes are partially lined up to the extent they can line up (upon moving the front handle at least 90% of the distance forward it is capable of moving), and air can pass from within the pressurized tank through the valve to outside the pressurized tank.

Figure 5:
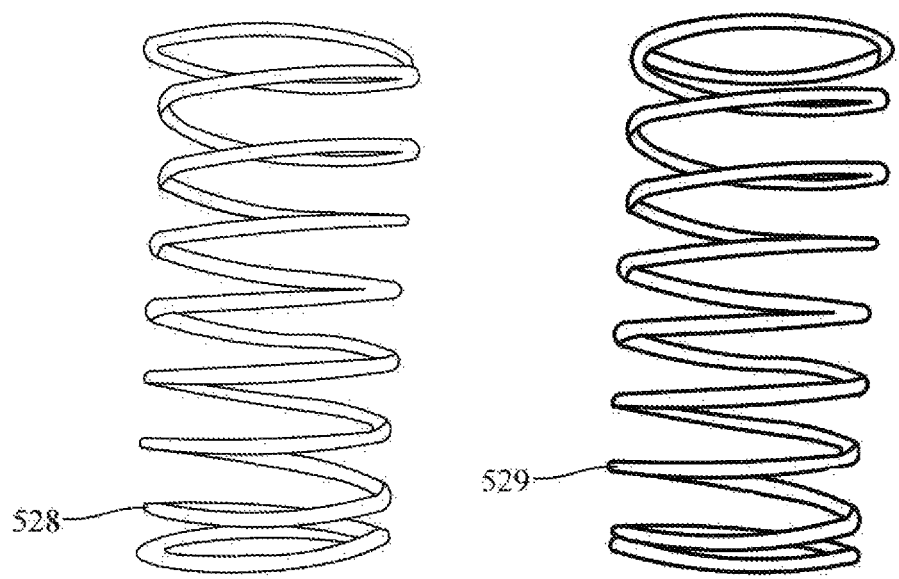
FIG. 5 depicts two different springs suitable for use with various embodiments of the MIS valves disclosed herein.

FIG. 5 depicts two different springs suitable for use with various embodiments of the MIS valves disclosed herein. The force exerted by the spring has an effect on the operation of the various MIS valve embodiments. A stiffer spring that exerts more force tends to open the valve more rapidly than a weaker spring. On the other hand, a stiffer spring also tends to make the MIS valve more difficult to close—that is, more difficult to pull the handle back from the open position to the closed position. Thus, the choice of spring stiffness involves a trade-off between valve speed and ease of use.

The two steel springs 528 and 529 shown in FIG. 5 have different spring rates that are typical of springs used in various embodiments of the MIS valve. Both springs have an outside diameter of 1.95 inches—slightly smaller than the inside diameter of the slip cylinder 327. Both springs 528 and 529 are slightly less than 4 inches long, and both are approximately linear. Some embodiments use non-linear springs. Spring 529 is considerably stiffer than spring 528. Spring 528 has a spring rate of 2.60 lbs. while spring 529 has a spring rate of 6.05 lbs. as measured at the springs' relaxed state.

In the MIS valve embodiment depicted in FIGS. 3A-B the springs 528 and 529 are compressed 2.625 inches when they are in an assembled MIS valve in the closed position. Since other embodiments of the MIS valve have different dimensions—both larger and smaller—the length of the spring in those other embodiments varies for a given implementation. The force exerted by the spring in the MIS valve when the valve is in the closed state is referred to herein as the closed-state spring force. Spring 529 has a closed-state spring force of 15.9 lbs.—that is, the spring 529 exerts a force of 15.9 lbs on slip cylinder 327 when in the closed state. As soon as a user twist the handle to open the valve this closed-state spring force acts to push slip cylinder 327 forward in the distal direction 475 to line up the slip cylinder holes 337 with the slotted chamber holes 343, thus opening the valve. Spring 528 is a weaker compression spring than spring 529. Spring 528 has a closed-state spring force of 6.8 pounds. This lesser force is quite adequate to open the valve, although at a slower speed than the spring 529.

Various embodiments use a variety of different springs having a wide range of different spring rates and relaxed state lengths. The MIS valve depicted in FIGS. 1A-C may utilize a spring with a closed-state spring force of as little as 0.5 pound to as great as 100 pounds for valves being used as part of pneumatic tire seaters similar to pneumatic tire seater 100 depicted in FIGS. 1A-C. Other purposes aside from this sort of pneumatic tire seater may use springs having a closed-state spring force outside this range, for example, as much as 250 lbs. Some embodiments use a spring having a closed-state spring force of 1.0 pounds or greater. Some embodiments use a spring having a closed-state spring force of 2.0 pounds or greater, or else within a range of 2.0 to 6.0 pounds. Some embodiments use a spring having a closed-state spring force of 5.0 pounds or greater, or else within a range of 5.0 to 12.0 pounds. Some embodiments use a spring having a closed-state spring force of 8.0 pounds or greater, or else within a range of 8.0 to 24.0 pounds, or else within a range of 8.0 to 35.0 pounds. Some embodiments use a spring having a closed-state spring force of 10.0 pounds or greater, or else within a range of 10.0 to 40.0 pounds. Further, the paragraphs above, and the figures, illustrate and explain an MIS valve using a compression spring. However, some of the various embodiments disclosed herein use tension springs (also called extension springs) that exert a closed-state spring force in the ranges disclosed above when stretched to the closed valve position.

Figure 6A:
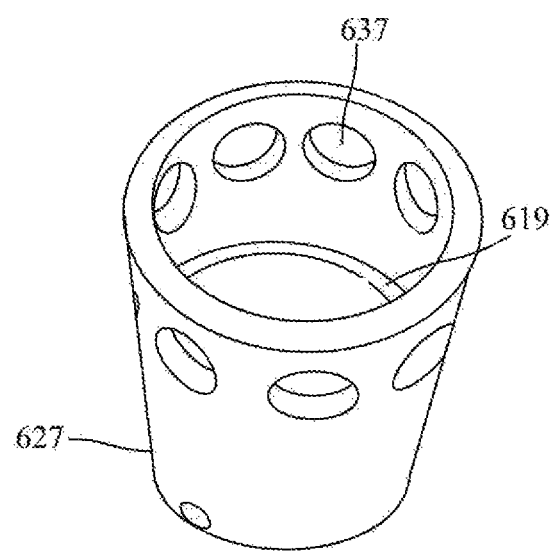
FIG. 6A depicts a slip cylinder with spring ledge according to various embodiments disclosed herein.

FIG. 6A depicts a slip cylinder with spring ledge according to various embodiments disclosed herein. Referring back to FIG. 3A, the spring 329 fits against end cap 333 and extends partially into slip cylinder 327. In order to exert force against slip cylinder 327, the spring 327 may either be attached to slip cylinder 327 or else push against a portion of slip cylinder 327. FIG. 6A illustrates an embodiment in which the spring pushes against a portion of slip cylinder 627. The slip cylinder 627 is configured with a ledge 619 inside it—that is, a point where the inside diameter of the slip cylinder 627 necks down to a smaller diameter, thus creating ledge 619. The spring 529 is compressed between ledge 619 and the end cap of the MIS valve, thus tending to push the slip cylinder in a distal direction (away from the user, towards the nozzle). The ledge 619 may be called a slip cylinder spring protuberance since it's a protuberance that the spring pushes against to move the slip cylinder 627. In various other embodiments the slip cylinder spring protuberance in the slip cylinder chamber that the spring pushes against is a protuberance other than a ledge. For example, in some embodiments the slip cylinder spring protuberance is one or more machine screws that is(are) inserted into threaded hole(s) within the slip cylinder chamber. In other embodiments the slip cylinder spring protuberance is one or more small protruding bits of metal welded to the inside of the slip cylinder chamber. In yet other embodiments there is no slip cylinder spring protuberance—but rather, the spring pushes against the proximal end of the slip cylinder.

It should be noted that, in the embodiment depicted in FIG. 6A, the spring sits within the slip cylinder 627 across the portion of the slip cylinder 627 with slip cylinder holes 637. Upon opening the MIS valve, the pressurized air passes through the slip cylinder holes 637 into the slip cylinder chamber and out through the nozzle. Thus, the pressurized air passes through the spring too, since the spring is adjacent the slip cylinder holes 637. This can be seen by viewing FIGS. 6B-C.

Figure 6B:
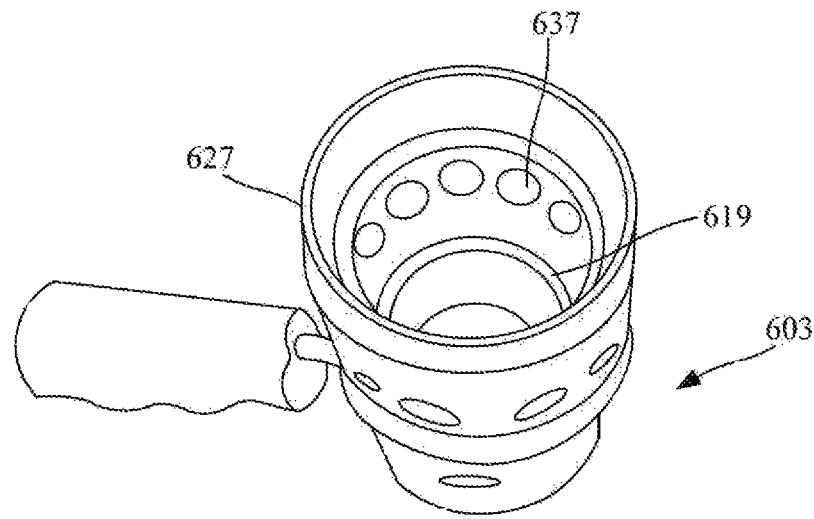
FIGS. 6B-C depict an MIS valve without a spring, and with the spring, respectively, according to various embodiments disclosed herein.
Figure 6C:
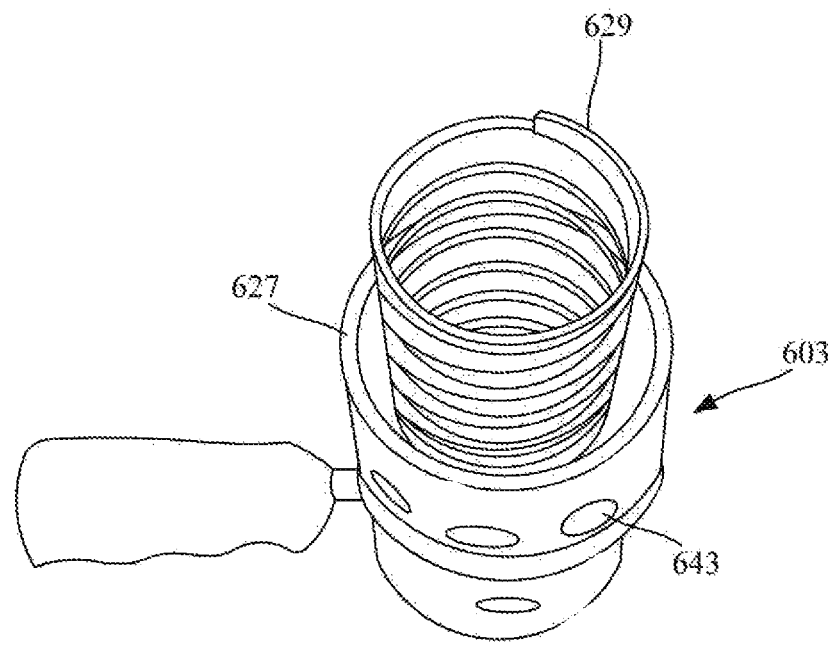

FIG. 6B depicts an MIS valve 603 without a spring. FIG. 6C depicts an MIS valve 603 with spring 629. To assemble the MIS valve 603 an end cap (e.g., end cap 333) is used to compress the spring 629 down against the slip cylinder. The end cap is then screwed (or otherwise fastened) on to the slotted chamber. The end of the MIS valve with the end cap is the proximal end, that is, the end that extends into the air tank 101 of FIGS. 1A-C. Upon opening the MIS valve 603 the pressurized air flows through the slotted chamber holes 643, through the slip cylinder holes 637, through the spring 629, and out the nozzle.

FIGS. 7A-B respectively depict a top view and a side view of the control cluster 709, according to various embodiments disclosed herein. The control cluster provides access to the interior of air tank 701 through a single access inlet. The control cluster typically has a multi-connection air manifold (called a control manifold) configured to accept two or more devices. For example, control cluster 709 has a three-way air manifold to which are attached a pressure gauge 755, an inlet valve 757, and a relief valve 759. The control manifold—for example, the three-way air manifold of FIGS. 7A-B—typically has a male threaded connector fitting on the bottom configured to screw into a female threaded access inlet in air tank 701. The control manifold also typically has two or more female connectors configured to accept devices such as the pressure gauge 755, the inlet valve 757 and/or the relief valve 759 of control cluster 709 depicted in FIGS. 7A-B.

The pressure gauge 709 indicates the pressure within air tank 101. The embodiment depicted in the figures features an analog pressure gauge 755. Other embodiments have a digital pressure gauge. The air tank 701 is filled from a source of high pressure air via the inlet valve 757. The inlet valve 757 has a valve control lever (or other mechanism), and a female pneumatic coupler. Other embodiments feature a female pneumatic coupler that closes automatically upon removing the source of high pressure air. Using this type of automatic female pneumatic coupler eliminates the need for an inlet valve control. The relief valve 759 prevents an unsafe high pressure from being put into the tank 701 or allowed to build up. The relief valve 759 is designed to open at a predetermined set pressure to protect the air tank 701 from being subjected to pressures that exceed their design limits. In some embodiments the relief valve 759 is adjustable to raise or lower the set pressure value, so as to allow a user or technician to set the limit at a level appropriate for the tank 701. In other embodiments the relief valve 759 is not adjustable, being permanently set at the factory or purchased having a predetermined set pressure value. In some embodiments the air tank may be configured to hold pressurized air at pressures of at least 150 psi. In other embodiments the air tank may be configured to hold pressurized air at pressures of at least 120 psi. In yet other embodiments the air tank may be configured to hold pressurized air at pressures of at least 200 psi.

FIG. 7B depicts a side view of the pneumatic tire seater 100 showing a clearance line 761. The clearance line 761 of the tank 701 and the carry handle 715 is defined as a line between the points on the tank 701 and the carry handle 715 that sit on a planer surface when the pneumatic tire seater 100 is set upside as in FIG. 1A. Clearance line 761 indicates how much room there is for the control cluster 709 beneath the level of carry handle 715. So long as the control cluster 709 is beneath the clearance line 761 between the tank 701 and the carry handle 715, the control cluster 709 won't be damaged by setting it upside down on a planar floor, table, bench, etc.

FIG. 7C is an oblique view depicting the distal end of the air tank 701 sitting upside down on its carry handle 715, according to various embodiments disclosed herein. FIG. 7C illustrates how the pneumatic tire seater 100 can be placed on a floor, table or other planar surface without damaging the control cluster 709. FIG. 7C also shows the female threads just inside the opening at the distal end of tank 701. The female threads are configured to receive the male threads of a nozzle in order to fasten the nozzle securely to the pneumatic tire seater 700.

FIG. 7C shows the length 763 of the flat portion of carry handle 715 that is configured to sit on a floor, table or other planar surface. The length 763 of the flat portion is typically approximately 3½ inches in length. In some embodiments the length 763 may be: 1 inch or greater: 2 inches or greater; 2½ inches or greater; 3 inches or greater or 4 inches or greater. In addition to each of these ranges with no upper limit, are ranges with a same lower limit and an upper limit of the diameter of tank 701 plus 20%. For example, a tank 701 may be implemented in many different diameters, including a diameter of 5 inches. (5 inches plus 20% is 6 inches.) The ranges with an upper limit for a tank 701 of diameter 5 inches are 2 inches to 6 inches; 2½ inches to 6 inches; 3 inches to 6 inches or 4 inches to 6 inches.

Figure 8D:
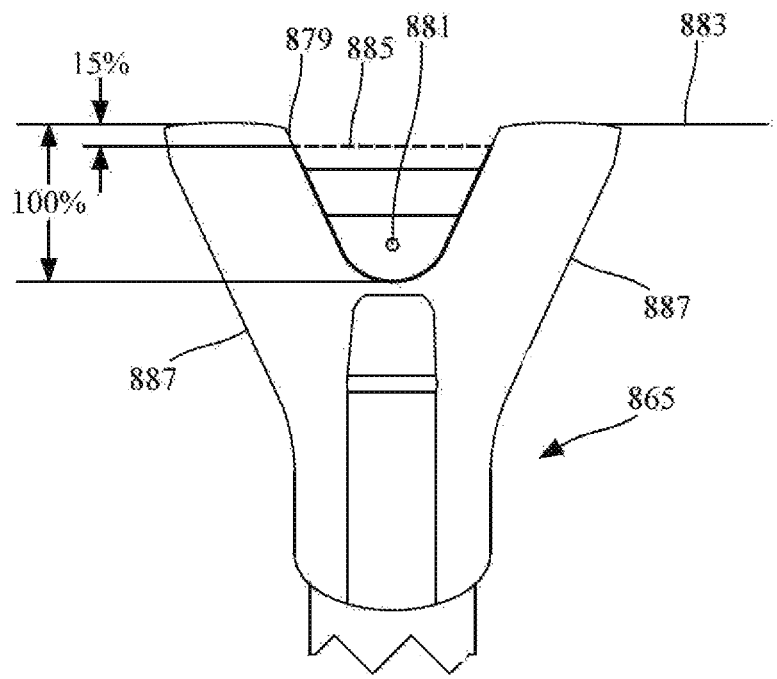
FIG. 8D depicts nozzle outlet section 865, according to various embodiments disclosed herein.
Figure 8A:
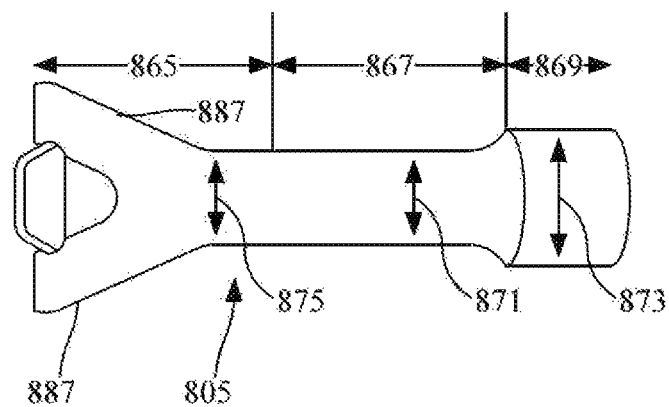
FIGS. 8A-C depict three views of the nozzle 805 according to various embodiments disclosed herein.
Figure 8B:
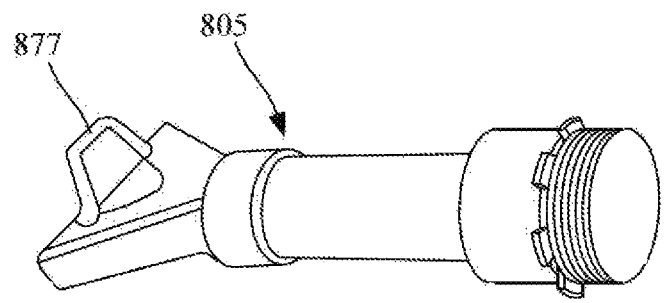
Figure 8C:
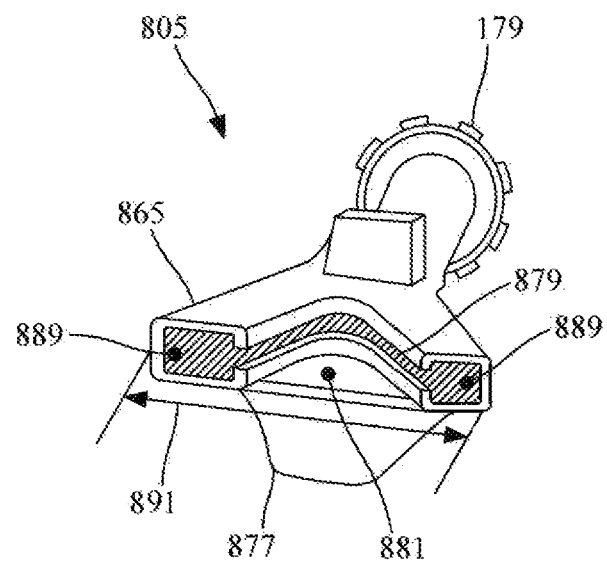

FIGS. 8A-C depict three views of the nozzle 805 according to various embodiments disclosed herein. FIG. 8A shows the three sections of nozzle 805—the nozzle inlet section 869, the neckdown section 867, and the nozzle outlet section 865. In various embodiments the nozzle outlet section 865 has a "Y" shaped outlet that disperses air around the inside of the wheel and tire rather than blowing a single stream of air directly at the hub of the wheel. The nozzle 805 may also be configured with a tab 877 mounted between the arms of the "Y" shaped nozzle outlet. A user can position the tab 877 against the rim so as to hold the pneumatic tire seater nozzle 805 steady while aiming it between the gap between the tire and the wheel. Some embodiments of the pneumatic tire seater do not have tab 877 since it tends to be more effective to hold the pneumatic tire seater nozzle 805 an inch or more away from the gap between tire and wheel.

Turning again to FIG. 8A, the figure depicts the inside diameter 871 of the neckdown section 867, the inside diameter 875 of nozzle outlet section 865, and the inside diameter 873 of nozzle inlet section 869. In various embodiments the inside diameter 871 of the neckdown section 867 is less than the inside diameter 873 of nozzle inlet section 869. This neckdown in the tube size of air path serves to increase the velocity of the air released from the MIS valve through the Venturi effect. Various embodiments of the nozzle have an assortment of different neckdown and inlet dimensions.

The embodiment depicted in FIG. 8A of nozzle 805 has a neckdown section inside diameter 871 of 1.5 inches and an inlet section inside diameter 873 of 2.125 inches. Since the nozzle 805 neckdown section 867 and inlet section 869 are both round, the respective area of these passageways is: neckdown section 867 area is 1.8 square inches; and inlet section 869 area is 3.6 square inches. The ratio between the areas of the two passage ways has an impact on the degree of the Venturi effect that is realized. The ratio of the nozzle inlet area/the neckdown section area is referred to herein as the nozzle neckdown ratio. The nozzle neckdown ratio of the nozzle 805 embodiment depicted in FIG. 8A is 2.0 (3.6 in$^2$/1.8 in$^2$). Various embodiments of the nozzle have nozzle inlets and neckdown cross-sections with a number of different shapes aside from round, including for example: square, rectangular, oval, oblong, rectangular with rounded ends, non-symmetrical, triangular, or other such-shapes as are known to those of ordinary skill in the art. These various embodiments of the nozzle have an assortment of nozzle neckdown ratios. For example, in different embodiments the nozzle neckdown ratio may be 1.2 or greater, may be 1.5 or greater, may be 1.75 or greater, may be 2.0 or greater, or may be 2.5 or greater. In some embodiments the nozzle neckdown ratio may be 1.2 to 1.8, may be 1.5 to 2.5, may be 1.75 to 3.5, may be 2.0 to 4.0, or may be 2.5 to 5.0.

FIG. 8C is an oblique view showing the nozzle outlet at distal end of nozzle 805. The nozzle outlet is "Y" shaped to direct air around the inside of the tire and wheel rather than blowing a single stream of air directly at the hub of the wheel. The throat 881 of nozzle 805 is the crotch of the "Y" shape. Various embodiments of nozzle 805 are configured with a gap or vent 879 that spans the surface of the throat 881. The vent connects from the nozzle outlet hole 889 of one nozzle outlet arm 887 to the nozzle outlet hole 889 of the other nozzle outlet arm 887. Initially it was thought that this vent 879 simply aided in distributing the pressurized air around the inside of the tire and wheel. Recently, however, it was discovered that the vent 879 pulls air in from the atmosphere to go into the tire, in addition to the air from the atmosphere outside the tire. To promote this effect some embodiments of the nozzle 805 are constructed without tab 877, since tab 877 tends to impede air being pulled into the tire-wheel gap by the pressurized air flowing from vent 879. In the embodiment depicted in FIGS. 8A-D, the nozzle width 891 (just outside the outlet holes 889) is approximately 4.25 inches. In various embodiments the nozzle width 891 may be no greater than 3.0 inches, no greater than 4.5 inches, no greater than 5.0 inches, no greater than 7.0 inches, or no greater than 12.0 inches. Other embodiments may have predefined nozzle widths that are wider or narrower than these specified ranges.

FIG. 8D depicts nozzle outlet section 865, according to various embodiments disclosed herein. Nozzle outlet section 865 is "Y" shaped, and as such, has two nozzle outlet arms 887 and a throat 881 between the two nozzle outlet arms 887. Line 883 is drawn across the tips (extreme distal points) of the two nozzle outlet arms 887. A vent 879 is configured within the throat 881 of the nozzle outlet section 865 along the inner surface of each nozzle outlet arm 887. To distinguish the vent 879 from the nozzle outlet holes 889, the vent 879 is defined as the gap in the nozzle throat 881 from a point 15% inward from the tips of each nozzle outlet arm 887.

The ratio of the area of the outlet holes 889 to the area of the vent 879 has an impact on the effectiveness of the air being pulled in to the gap between the tire and the rim. This ratio is referred to herein as the nozzle outlet-vent ratio. In the embodiment depicted in FIGS. 8A-D each of the outlet holes 889 has an area of approximately 0.645 square inches, and the area of the vent 879 (between the 15% points in FIG. 8D) is approximately 0.773 square inches. The area of both outlet holes 889 together is 1.290 square inches (0.645×2). Hence, the nozzle outlet-vent ratio of the FIGS. 8A-D embodiments is 1.290/0.773, or 1.667. The various embodiments have a nozzle outlet-vent ratio that conform to one or more of the following ranges: greater than 0.2; greater than 0.5; greater than 0.8; greater than 1.0; greater than 1.2; greater than 1.5; greater than 2.0; between 0.2 and 1.0; between 0.5 and 1.5; between 0.8 and 20.0; between 1.0 and 2.5; between 1.2 and 3.0; between 1.5 and 3.5; between 2.0 and 4.0; less than 1.0; less than 1.5; less than 2.0; less than 3.0; less than 4.0; or less than 5.0.

Figure 9:
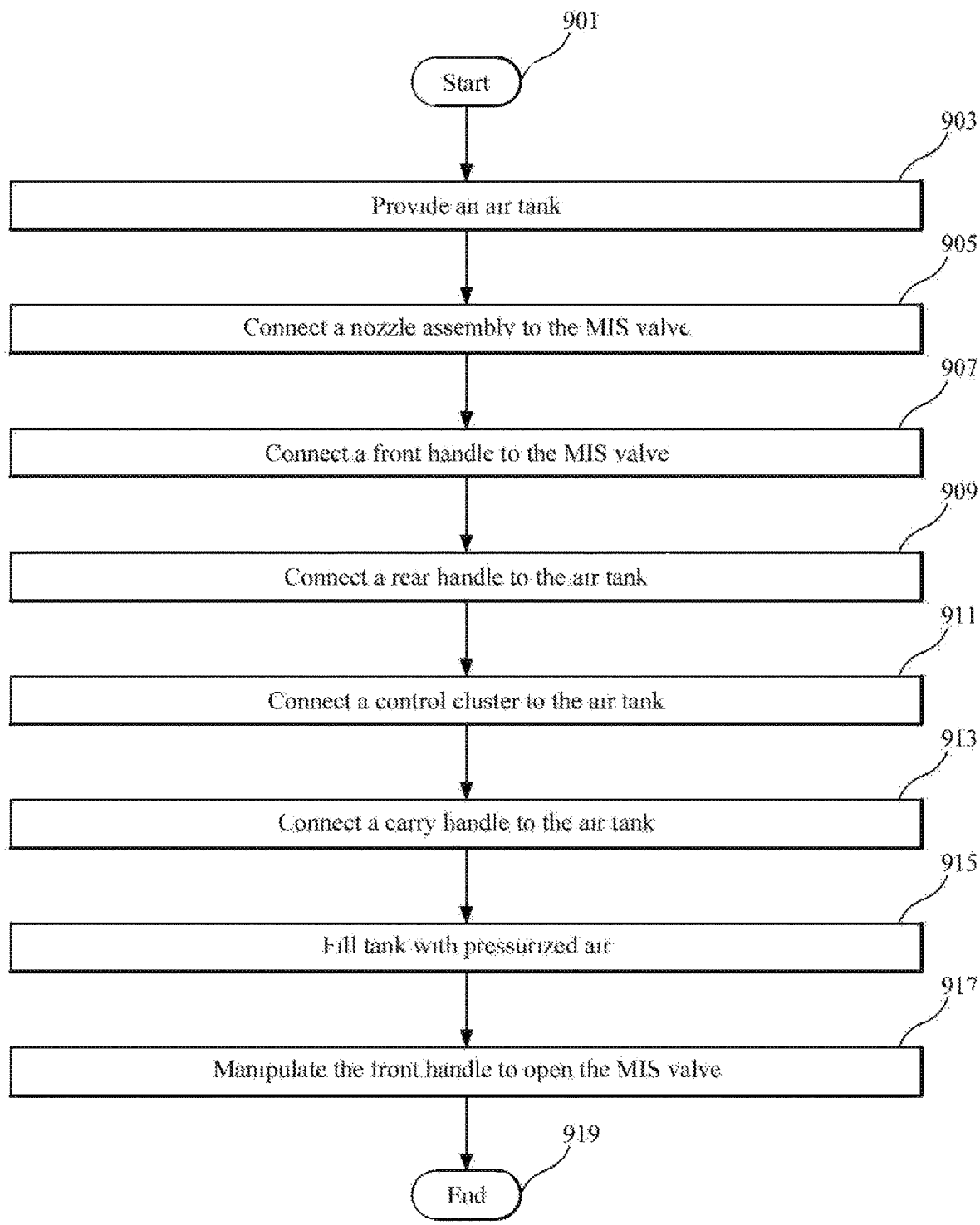
FIG. 9 is a flowchart depicting the use of the MIS pneumatic tire seater according to various embodiments of the invention.

FIG. 9 is a flowchart depicting the use of the MIS pneumatic tire seater according to various embodiments of the invention. The method begins at block 901 and proceeds to block 903 where an air tank is provided, for example, such as the air tank depicted in FIGS. 1A-C or the tank depicted in FIGS. 2A-B. Upon procuring a tank the method proceeds to block 905 for attachment of a nozzle assembly to the air tank. The method proceeds to block 907 to connect a front handle to the MIS valve. The method proceeds to block 909 to connect a rear handle to the air tank. In block 911 a control cluster is connected to the air tank. The control cluster provides multiple devices (e.g., a pressure gauge, an inlet valve, and a relief valve) pneumatic communication to the inside of the tank through a single access inlet in the tank. This avoids the need to drill multiple holes in the air tank for the various devices connected to it. In block 913 a carry handle 913 is connected to the tank. The carry handle may be configured to protect the control cluster from damage when the tire seater is set upside down, in addition to being a convenient hand-hold for carrying the pneumatic tire seater.

Upon assembling the pneumatic tire seater the method proceeds to block 915 where the tank is filled with pressurized air. The amount of air to be pumped into the tank—as determined by the reading on the pressure gauge—is determined by the type and size of tire being seated. Larger tires contain a larger volume of air, and thus require a high pressure in the air tank to seat them. Upon filling the tank in block 915 the method proceeds to block 917 where the user manipulates the front handle to open the MIS valve. Typically, this is done by twisting the handle slightly (e.g., less than 10 degrees) laterally and pushing (or allowing the handle to be pushed) forward. The spring in the MIS valve provides force to push the front handle forward and open the valve, rapidly releasing the air from the tank. Typically, little or no effort is required on the part of the user to push the front handle forward and open the valve, depending upon the spring rate (stiffness) of the spring in the given embodiment of the pneumatic tire seater. Upon opening the valve in block 917, the method proceeds to block 919 and ends.

Various activities may be included or excluded as described above, or performed in a different order as would be known by one of ordinary skill in the art, while still remaining within the scope of at least one of the various embodiments. For example, the carry handle may (and generally is) connected to the tank (block 913) before connecting the control cluster to the tank (block 911). Further, blocks 905 to 913 may be implemented in various different orders. The descriptions contained in this disclosure are written in terms of an MIS valve used as part of a pneumatic tire seater tire mounting device. However, the MIS valve may be used in other types of devices or for other purposes.

For the sake of brevity within this disclosure the slip cylinder holes 337 and the slotted chamber holes 343 are referred to herein and depicted as being circular, e.g., as shown in FIG. 3B. However, in practice the slip cylinder holes 337 and/or the slotted chamber holes 343 may be any of a number of shapes or sizes. For example, the slip cylinder holes 337 and/or the slotted chamber holes 321 could be round, oval, oblong, square, triangular, rectangular (slotted), pentagonal, hexagonal, with rounded corners, with square, triangular or other sharp corners, a non-symmetrical shape, or other like shapes as are known to those of ordinary skill in the art. Moreover, the slip cylinder holes 337 and the slotted chamber holes 343 may be the same or similar shape, or may be different in shape. The slip cylinder holes 337 and the slotted chamber holes 343 may have the same area or may have different areas. The slip cylinder holes 337 and the slotted chamber holes 343 may have inwardly sloped (or concave) or outwardly sloped (or convex) edges, may have straight edges, or may have a combination of any of these.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises," "comprising," "includes," and/or "including" used in this specification specify the presence of stated features, integers, steps, operations, elements, and/or components, but do not preclude the presence or addition of one or more other features, integers, steps, operations, elements, components, and/or groups thereof. The term "plurality", as used herein and in the claims, means two or more of a named element. It should not, however, be interpreted to necessarily refer to every instance of the named element in the entire device. Particularly, if there is a reference to "each" element of a "plurality" of elements. There may be additional elements in the entire device that are not be included in the "plurality" and are not, therefore, referred to by "each."

The word "substantially" (e.g., substantially vertical or substantially one foot) as used herein in the specification and claims is meant to mean plus or minus as much as 2%. For example, substantially one foot as used herein means any length within the range of 1 foot+/−0.02 foot. Similarly, an angle of 10 degrees as used herein means any angle within the range of 10 degrees+/−0.2 degree. The word "approximately" as used herein means the same as the word "substantially." The phrase "slightly less than" as used herein, is defined to mean at least 99.5% of. For example, a slip cylinder outside diameter of slightly less than the slotted chamber inside diameter means that the slip cylinder outside diameter is at least 99.5% of the slotted chamber inside diameter. The phrase "lining up" is used herein in regards to the slotted-chamber holes and the slip-cylinder holes. As used herein the phrase "lining up" may either mean that the slotted-chamber holes are beginning to line up with the slip-cylinder holes (and are partially lined up), or "lining up" may be used to mean that slotted-chamber holes are fully lined up with the slip-cylinder holes (to the extent they will line up for the given implementation), depending upon the context in which the phrase "lining up" is used.

The word "incline" (or "inclined") means angled from a line, direction, component, surface or the like. For example, the phrase "inclined 15 degrees from vertical" as used herein means "angled 15 degrees from vertical". Two components that are in "pneumatic communication", as this phrase is used herein, means that air (e.g., pressurized air) passes between the two components. The phrase "pneumatically connected" means the same as "in pneumatic communication." More than two components can be "in pneumatic communication" (or be pneumatically connected). For example, the pressure gauge 755, the inlet valve 757 and the relief valve 759 are each in pneumatic communication (or are pneumatically connected) to the air tank via the three-way air manifold of the control cluster 709. This means that high pressure air within the air tank passes through the three-way air manifold of the control cluster 709 to each of the pressure gauge 755, the inlet valve 757 and the relief valve 759. The "slotted chamber holes" (e.g., slotted chamber holes 343) may also be called simply "slotted-chamber holes". The "slip cylinder holes" (e.g., slip cylinder holes 337) may also be called "slip-cylinder holes". In regards to the term "pressurized air", it is understood that upon releasing the pressurized air from the air tank, the pressure of that air drops considerably—although it is still pressurized above atmospheric pressure upon being received within a seated tire. To simplify the explanation herein, the pressurized air released from the air tank will still be called pressurized air even when it has been released from the tank and blown from the nozzle, so as to distinguish it from all other air or gases.

The corresponding structures, materials, acts, and equivalents of all means or step plus function elements, if any, in the claims below are intended to include any structure, material, or act for performing the function in combination with other claimed elements as specifically claimed. This disclosure of the various embodiments has been presented for purposes of illustration and description, and is not intended to be exhaustive in the form disclosed. Many modifications and variations will be apparent to those of ordinary skill in the art without departing from the scope and gist of the invention. The various embodiments included herein were chosen and described in order to best explain the principles of the invention and the practical application, and to enable others of ordinary skill in the art to understand the invention for various embodiments with various modifications as are suited to the particular use contemplated. The description of the various embodiments provided above is illustrative in nature inasmuch as it is not intended to limit the invention, its application, or uses. Thus, variations that do not depart from the intents or purposes of the invention are encompassed by the various embodiments of the present invention. Such variations are not to be regarded as a departure from the intended scope of the present invention.

The invention claimed is:

1. A pneumatic tire seater comprising:
   an air tank configured to hold pressurized air at pressures of at least 150 psi;
   a gas valve in pneumatic communication with the air tank;
   a nozzle comprising a proximal end connected to a distal end of the gas valve and further comprising a distal end;
   a slotted chamber configured as part of the gas valve, said slotted chamber having a slotted chamber inside diameter and comprising one or more slotted-chamber holes;
   a slip cylinder configured as part of the gas valve, said slip cylinder comprising one or more slip-cylinder holes and having a slip cylinder outside diameter of slightly less than the slotted chamber inside diameter; and
   a valve switch component connected to the slip cylinder, wherein the valve switch component is a front handle configured to be twisted laterally around a central axis of the gas valve and pushed forward to align the one or more slotted-chamber holes with the one or more slip-cylinder holes;
   wherein the gas valve releases the pressurized air from the air tank through the nozzle in a distal direction in response to the one or more slotted-chamber holes lining up with the one or more slip-cylinder holes;
   wherein the gas valve has an opening time of no greater than 150 ms.

2. The pneumatic tire seater of claim 1, wherein the one or more slotted-chamber holes lining up with the one or more cylinder holes occurs in response to the valve switch component being manipulated; and
   wherein the air tank is configured to hold pressurized air at pressures of at least 120 psi.

3. The pneumatic tire seater of claim 2,
   wherein the pressurized air released through the nozzle is sufficient to seat a truck tire.

4. The pneumatic tire seater of claim 3, further comprising:
   a spring configured to apply force in the distal direction to push the slip cylinder and front handle forward;
   wherein the gas valve has an opening time of no greater than 85 ms; and
   wherein the pressurized air released through the nozzle is sufficient to seat a P235/75R15 tire.

5. The pneumatic tire seater of claim 4, wherein the spring is a compression spring with a closed-state spring force of 8.0 pounds or greater;
   wherein the nozzle is configured to blow the pressurized air into a space between a tire and a wheel to seat the tire on the wheel.

6. The pneumatic tire seater of claim 5, wherein the pressurized air passes from within the air tank through the compression spring, through the one or more slip-cylinder holes, and through the one or more slotted-chamber holes to the nozzle.

7. The pneumatic tire seater of claim 2, wherein the nozzle comprises a first nozzle arm and a second nozzle arm, the first nozzle arm including a first nozzle outlet hole and the second nozzle arm including a second nozzle outlet hole; and
   wherein the first nozzle arm and the second nozzle arm are configured to disperse the pressurized air around the space between the tire and the wheel.

8. The pneumatic tire seater of claim 7, wherein the nozzle comprises a vent configured on a throat running between the first nozzle outlet hole and the second nozzle outlet hole.

9. The pneumatic tire seater of claim 8, wherein the vent has a nozzle outlet-vent ratio greater than 1.5.

10. The pneumatic tire seater of claim 2, wherein the nozzle comprises a nozzle inlet and a nozzle neckdown section; and
    wherein the nozzle is characterized by a nozzle neckdown ratio of 1.5 or greater.

11. The pneumatic tire seater of claim 2, wherein the air tank is cylindrical with rounded ends and has a cylindrical section outside diameter of between 3.75 and 6.5 inches.

12. A method of constructing a pneumatic tire seater for seating a tire, the method comprising:
    providing an air tank configured to hold pressurized air at pressures of at least 150 psi;
    connecting a gas valve to be in pneumatic communication with the air tank;
    connecting a nozzle to a distal end of the gas valve, the nozzle comprising a proximal end and a distal end;
    providing a slotted chamber configured as part of the gas valve, said slotted chamber having a slotted chamber inside diameter and comprising one or more slotted-chamber holes;
    providing a slip cylinder configured as part of the gas valve, said slip cylinder comprising one or more slip-cylinder holes and having a slip cylinder outside diameter of slightly less than the slotted chamber inside diameter,
    connecting a valve switch component to the slip cylinder, wherein the valve switch component is a front handle;
    configuring the gas valve to release the pressurized air from the air tank through the nozzle in a distal direction in response to the one or more slotted-chamber holes lining up with the one or more slip-cylinder holes; and
    configuring the front handle to be twisted laterally around a central axis of the gas valve and pushed forward to line up the one or more slotted-chamber holes with the one or more slip-cylinder holes.

13. The method of claim 12, wherein the air tank is configured to hold pressurized air at pressures of at least 200 psi.

14. The method of claim 13, further comprising:
    providing a spring configured to apply force in the distal direction to push the slip cylinder and front handle forward; and
    wherein the pressurized air released through the nozzle is sufficient to seat a P235/75R15 tire.

15. The method of claim 12, wherein the nozzle comprises a first nozzle arm and a second nozzle arm, the first nozzle arm including a first nozzle outlet hole and the second nozzle arm including a second nozzle outlet hole, the first nozzle arm and the second nozzle arm being configured to disperse the pressurized air around the space between the tire and the wheel.

16. The method of claim 15, further comprising:
    providing a vent configured on a throat of the nozzle running between the first nozzle outlet hole and the second nozzle outlet hole.

17. The method of claim 16, wherein the vent has a nozzle outlet-vent ratio greater than 1.5.

18. The method of claim 12, wherein the nozzle comprises a nozzle inlet and a nozzle neckdown section; and
    wherein the nozzle is characterized by a nozzle neckdown ratio of 1.5 or greater.

19. The pneumatic tire seater of claim 1, wherein the air tank configured to hold pressurized air at pressures of at least 200 psi.

* * * * *